United States Patent
Sahajwalla

(10) Patent No.: US 8,021,458 B2
(45) Date of Patent: Sep. 20, 2011

(54) PRODUCTION OF FERRO-ALLOYS

(75) Inventor: Veena Sahajwalla, Sydney (AU)

(73) Assignee: New South Innovations Pty. Limited, Sydney, New South Wales (AU)

( * ) Notice: Subject to any disclaimer, the term of this patent is extended or adjusted under 35 U.S.C. 154(b) by 0 days.

(21) Appl. No.: 11/574,649

(22) PCT Filed: May 20, 2005

(86) PCT No.: PCT/AU2005/000720
§ 371 (c)(1),
(2), (4) Date: Aug. 27, 2007

(87) PCT Pub. No.: WO2006/024069
PCT Pub. Date: Mar. 9, 2006

(65) Prior Publication Data
US 2008/0092692 A1    Apr. 24, 2008

(30) Foreign Application Priority Data

Sep. 3, 2004 (AU) ................................ 2004905074
Nov. 10, 2004 (AU) ................................ 2004906453

(51) Int. Cl.
C21C 5/52 (2006.01)
C21C 7/00 (2006.01)
C21B 13/12 (2006.01)

(52) U.S. Cl. ..................... 75/10.61; 75/10.46; 75/10.59; 75/10.6

(58) Field of Classification Search ................... 75/10.6, 75/10.61; 266/287
See application file for complete search history.

(56) References Cited

U.S. PATENT DOCUMENTS

| 4,767,451 A | * | 8/1988 | Bergman et al. | 75/10.61 |
| 5,221,512 A | | 6/1993 | Sancinelli | |
| 5,554,207 A | | 9/1996 | Bogdan et al. | |
| 5,851,263 A | * | 12/1998 | Bernet et al. | 75/10.41 |
| 5,954,855 A | * | 9/1999 | Gitman et al. | 75/10.42 |
| 2002/0112567 A1 | * | 8/2002 | Kawakami et al. | 75/524 |
| 2003/0000338 A1 | * | 1/2003 | Shver | 75/10.41 |

FOREIGN PATENT DOCUMENTS

| EP | 187008 | 7/1986 |
| EP | 0451323 (A2) | 10/1991 |
| EP | 0657549(A1) | 6/1995 |
| EP | 0663579 (A1) | 7/1995 |
| EP | 1799875 A1 | 6/2007 |
| JP | 59-133309 | 7/1984 |
| JP | 2004-052002 A | 2/2004 |
| WO | WO 97/18336 * | 5/1997 |
| WO | WO9718336 | 5/1997 |
| WO | WO2006024069 A1 | 9/2006 |

OTHER PUBLICATIONS

J. Jones, Understanding Electric Arc Furnace Operations, 1997, EPRI Center for Materials Production.*

* cited by examiner

*Primary Examiner* — Jerry A Lorengo
*Assistant Examiner* — Jared Wood
(74) *Attorney, Agent, or Firm* — Merchant & Gould P.C.

(57) ABSTRACT

A method for producing a ferro-alloy in an electric arc furnace is disclosed. The method comprises the step of charging the furnace with an un-agglomerated carbon-containing polymer such that the polymer functions as a slag foaming agent.

16 Claims, 14 Drawing Sheets

Slag foaming as a function of time for graphite/slag system at 1550°C.

Schematic diagram of the experimental set-up

FIG. 2 Slag foaming as a function of time for graphite/slag system at 1550°C.

Images of slag foaming caused by various carbonaceous materials

XRD spectra of 50%plastic+50%graphite mixture a. graphite
b. 50%plastic+50%graphite
c. coke Images of slag foaming caused by various carbonaceous materials IR results for the reaction between graphite substrate and slag IR results for the reaction between
50%plastic+50%graphite substrate and slag IR results for the reaction between coke substrate and slag

PRODUCTION OF FERRO-ALLOYS

TECHNICAL FIELD

A method for producing ferro-alloys (such as steel) in an electric arc furnace (EAF) employing a novel additive is disclosed. In its primary function the novel additive functions as a slag foaming agent, as a reducing agent. However, the additive may additionally act as a fuel and/or as a recarburiser.

BACKGROUND ART

In the last fifty years, the plastics industry has seen enormous growth such that plastic materials and products are now essential to society. Plastic production in countries like Japan has reached around 15 million tonnes per year, and this results in about 9 million tonnes per year of related waste, 50% of which is associated with municipal solid waste.

There are increasing problems with plastics disposal, and internationally plastics recycling accounts for a small proportion of material recovery, with the rest being disposed either through land-filling or burning in incinerators. Plastic materials do not degrade readily and can leach toxic elements in landfill, whilst conventional burning often generates hazardous emissions such as dioxins.

Worldwide the steel industry is facing pressure to minimise its impact on the environment by improving the efficiency of energy and resource utilisation. For example, particular efforts have been made to reduce the carbon intensity of a blast furnace. One strategy of energy management of a blast furnace involves the reduction of fuel or coke consumption. As a substitute fuel, plastic injection into the tuyeres of a blast furnace has been proposed to reduce $CO_2$ emissions, because plastics have a combustion energy that is at least as high as the pulverised coal normally injected, and they have a higher ratio of hydrogen to carbon, resulting in less $CO_2$ produced as a combustion product.

Plastic addition to other types of steelmaking furnaces is known, including to electric arc furnaces (EAF). For example, U.S. Pat. No. 5,554,207 discloses a process in which EAF waste dust is combined with waste plastic to form a solid, which is then added to the EAF. Similarly, JP2004-052002 discloses a process in which waste plastics are knedaded together with steel dust to form a soft solid which is added to the EAF. Neither document is concerned with the addition of an additive to promote slay foaming.

SUMMARY

In a first aspect there is provided, in a method for producing a ferro-alloy in an electric arc furnace, the step of charging the furnace with an un-agglomerated carbon-containing polymer such that the polymer functions as a slag foaming agent.

The terminology "un-agglomerated carbon-containing polymer" covers both fine and coarse granulated and particulate polymers and is intended to exclude such polymers as formed together with EAF waste dust or steel dust. Such agglomerated solids would not function as a slag foaming agent.

It has not previously been contemplated, in an electric arc furnace, that an un-agglomerated carbon-containing polymer could be used to cause slag foaming. In an electric arc furnace increased slag foaming better blankets the molten metal both and better holds in both heat (ie. insulates), and this leads to considerably reduced electricity consumption in the EAF.

The un-agglomerated carbon-containing polymer may additionally function as a reducing agent, as a fuel and/or as a recarburiser in the method for producing the ferro-alloy. The polymer could then cause a reduction of metal(s) oxides present in furnace feed and/or generated during metal processing; and/or act as a source of fuel; and/or act as a recarburiser to increase the amount of carbon present with iron in the final ferro-alloy produced. For example, in electric arc furnaces, the primary fuel source has been electricity.

The waste plastic can thus enhance energy efficiency (ie. by the use of less electricity), and can reduce the consumption (and hence cost) of traditional carbon sources such as coke and coal. The waste plastic may also replace or reduce the use of expensive recarburisers such as anthracite coal and graphite.

When the term "ferro-alloy" is used herein it is intended to include a broad range of iron-carbon alloys (including steels) and other iron-carbon and/or iron-based alloys, including ferrochromium, ferrochromium silicon, ferromanganese, ferrosilicomanganese, ferrosilicon, magnesium ferrosilicon, ferromolybdenum, ferronickel, ferrotitanium, ferrophosphorous, ferrotungsten, ferrovanadium, ferrozirconium etc.

Typically the un-agglomerated carbon-containing polymer is charged into the furnace such that it at least partially combusts and produces a carbonaceous residue. As it combusts. The polymer acts a fuel. The carbonaceous residue can then oxidise to cause slag foaming. The residue may additionally function as a reducing agent or recarburiser. Thus, typically, the un-agglomerated carbon-containing polymer charged into the furnace functions as a slag foaming precursor. It may also function as a recarburiser precursor or reducing agent precursor.

Whilst the un-agglomerated carbon-containing polymer may comprise the sole additive charged into the furnace, in a typical embodiment the un-agglomerated carbon-containing polymer is charged into the furnace with another source of carbon. This other source of carbon may combust to act a fuel. It may also contributed to slag foaming, and may function as a reducing agent or recarburiser. The other source of carbon can be coal, coke, carbon char, charcoal or graphite.

As an example, the un-agglomerated carbon-containing polymer and other source of carbon can be charged into the furnace approximately in a weight ratio of 1:1, although this ratio may vary from furnace to furnace.

In a typical adaptation of the method, the carbon-containing polymer is a waste plastic. The charging of a waste plastic into the furnace provides an effective means of disposal of the waste plastic, which otherwise poses environmental challenges.

Typically the carbon-containing polymer comprises the atoms C, H and optionally O only. Whilst other elements may be present in the polymer (eg. N, S, P, Si, halogens etc) these other elements may interfere with ferro-alloy production and/or produce contaminants, pollutants, noxious gases etc. Thus, by judiciously selecting the carbon-containing polymer, the formation of noxious gases and other detrimental or harmful products can be avoided. One suitable plastic is polyethylene but other plastics such as polypropylene, polystyrene, poly butadiene styrene, ABS, etc and even difficult to re-process plastics such as Bakelite, etc may be employed.

Typically the un-agglomerated carbon-containing polymer is charged into the furnace is the form of polymer particles, typically of a particle size of 100 um or less.

Whilst a typical ferro-alloy produced is steel, the production of other ferro-alloys (as described above) may employ the charging of an un-agglomerated carbon-containing polymer.

In a second aspect there is provided the use of an un-agglomerated carbon-containing polymer as a slag foaming agent in the production of a ferro-alloy in an electric arc furnace.

Typically the use of the un-agglomerated carbon-containing polymer is in the production of a ferro-alloy achieved by the method of the first aspect.

In a third aspect there is provided a method for producing a ferro-alloy in an electric arc furnace, the method comprising the steps of:
  charging the furnace with feedstock for the ferro-alloy;
  heating the feedstock in the furnace to a molten state and to form a slag on a molten surface of the alloy/feedstock; and
  charging the furnace with an un-agglomerated carbon-containing polymer that functions as a slag foaming agent.

Typically the un-agglomerated carbon-containing polymer is charged so as to combust in the furnace and release heat energy to the molten alloy/feedstock and to generate a substance that foams the slag.

Optionally the substance can in addition to foaming the slag:
  causes a chemical reduction of each metal oxide in the slag to produce the ferro-alloy;
  recarburise a resultant alloy of iron and carbon.

The un-agglomerated carbon-containing polymer can be charged with an additional agent. The additional agent may be the other source of carbon as defined in the first aspect.

The un-agglomerated carbon-containing polymer may also be charged with the feedstock to the furnace. For example, the furnace can already be heated when the feedstock and carbon-containing polymer are charged therein (ie. in a continuous furnace operation mode).

Typically the method of the third aspect is otherwise as defined in the first aspect.

The inventors have also surmised that the un-agglomerated carbon-containing polymer can generally be employed as a fuel in a reheating furnace.

Accordingly, in a fourth aspect there is provided, in a method of operating a reheating furnace, the step of charging the furnace with an un-agglomerated carbon-containing polymer to act as a fuel.

Typically the reheating furnace operates at a temperature sufficient to combust the carbon-containing polymer, typically a temperature that is greater than 1000° C.

In addition, the un-agglomerated carbon-containing polymer may be charged into the furnace in a particulate form and optionally with another fuel, such as natural gas.

In a fifth aspect a system is provided for determining the recyclability of a carbon-containing polymer in a ferro-alloy production furnace that employs a carbon-containing feedstock. The system comprises the steps of:
  deriving a value of a parameter of a given polymer that is reflective of the polymer's slag foaming ability;
  comparing that parameter to one or more parameter values derived from one or more other polymers;
  developing a range or scale from those parameter values.

The parameter can be the height of the foam slag and/or the life of the foam slag.

BRIEF DESCRIPTION OF THE DRAWINGS

Notwithstanding other embodiments which may fall within the method for producing a ferro-alloy as defined in the Summary, specific embodiments of the method will now be described, by way of example only, with reference to the accompanying drawings in which.

DETAILED DESCRIPTION OF SPECIFIC EMBODIMENTS

Figure 1:
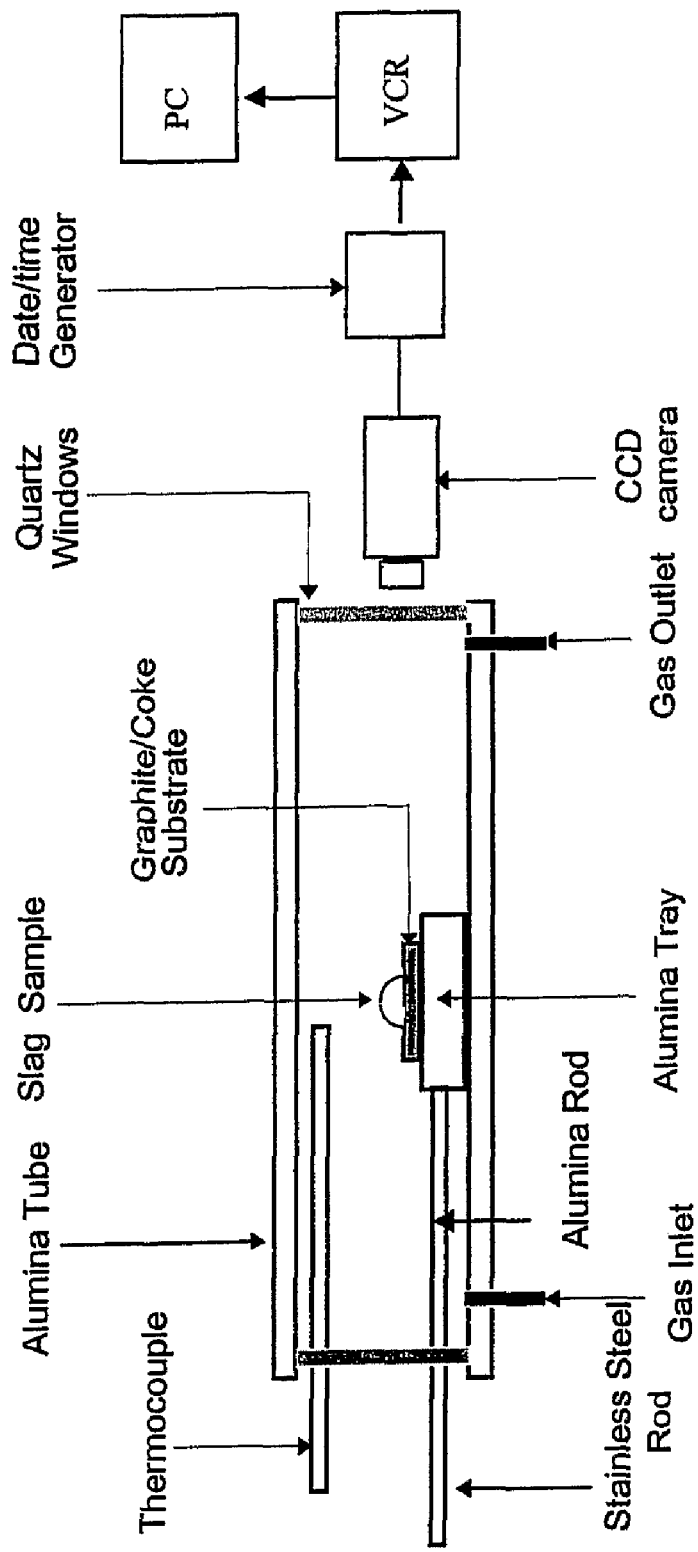
FIG. 1 shows a schematic diagram of a horizontal tube resistance furnace set up for a sessile drop approach, as described in Example 1.

During extensive studies of EAF steel production, it was noted that the chemical reactions between solute carbon/solid carbon and slag gave rise to the process of slag foaming. Slag foaming occurred due to CO gas generation as a result of the reduction of iron oxide in the slag by carbon, and also due to the oxidation of carbon. Slag foaming was noted to be strongly dependent on the nature of the carbon feed material, with properties of the material at high temperatures governing the slag foaming phenomenon.

It was further noted that, as well as shielding the electric arc, a foamy slag blanketed the metal bath and held in heat, leading to considerable energy savings (ie. reduced electricity consumption). It was noted that a sustained level of slag foaming was critical to efficient EAF steel production.

In a surprising development, it was postulated that a un-agglomerated carbon-containing polymer (eg. waste plastic, typically in particulate form) could be introduced into EAF steel production. It was surmised that, at the high temperatures employed in EAF steel production, the waste plastic would, once introduced into the furnace, combust (thus acting as a fuel) and produce a carbonaceous residual product. Subsequently, it was postulated that a carbon-containing polymer could also be introduced into the production of other ferro-alloys and again produce a carbonaceous residual product.

It was observed that the carbonaceous residual product could then cause slag foaming in EAF steel production, and might optionally function as a reducing agent (eg. in the production of other ferro-alloys), and optionally also function as a recarburiser.

During testing, it was hypothesised that the chemical composition, structure and bond network in the original plastic determined the properties of the carbonaceous residue. In addition, it was noted that the kinetics of carbon dissolution from a given plastic depended on the rate at which the carbonaceous residue dissolved in liquid steel. It was postulated that the relatively highly ordered nature of carbon in plastics (eg. compared to carbon in coke) could result in enhanced carbon dissolution in liquid steel.

Structural characterisation of the carbonaceous residues was conducted from a plastic-graphite mixture introduced into a drop-tube furnace (simulating operating conditions that might be experienced in an EAF) to observe those carbonaceous residues that would subsequently lead to foaming of liquid slag in an EAF, and to ascertain those carbonaceous residues that might have a reduction capacity and/or enhanced carbon dissolution in a molten ferro-alloy. The structural characterisation results are set forth below in Example 5.

In the production of other ferro-alloys it was noted that a variety of carbonaceous reducing materials were being used. Known reductant materials included carbons such as coke, coal and char, and bio-carbons in form of charcoal produced from different types of wood. Again, it was noted that the material properties and reactions of these carbonaceous materials played a significant role in dictating reductant performance.

Major experimental considerations thus also included, amongst others, investigations into gasification of the reductant, dissolution of carbon into the molten metal, and direct reduction of slag by solid carbon.

The formation of slag was also noted to be typical in the production of ferro-alloys other than steel. Manganese and chromium were both reduced in solid and liquid states. Dissolution of MnO in the slag followed by reduction from the slag by solid carbon or carbon dissolved in liquid metal was considered as the major mechanism of MnO reduction. Similarly, reduction of chromite in liquid slag by carbon dissolved in Fe—Cr melts was noted to be important for the production of ferrochromium. The reactions between carbon and liquid slag containing dissolved ore (chromium, manganese oxides) played a vital role in the reduction process. It was therefore postulated that carbonaceous residues from waste plastics were also able to be used as a reductant (and, as necessary, slag foaming agent) in the production of other ferro-alloys.

EXAMPLES

Non-limiting examples of methods for producing a ferro-alloy will now be provided.

Example 1

To investigate slag foaming, slag/carbon interactions were first investigated in a laboratory scale, horizontal tube resistance furnace using the sessile drop approach. A schematic diagram of the experimental set up is shown in FIG. 1. The weight of the slag used was ~0.20 g. Initially, the sample was held on a specimen holder, which could be pushed to the centre of the hot zone in the furnace with the help of a stainless steel rod.

The slag/carbon assembly was held in the cold zone of the furnace until the desired temperature (1550° C.) was attained and equilibrated in the hot zone of the furnace. The assembly was inserted into the hot zone at the desired temperature of study. This eliminated any reaction that could occur at lower temperatures and possibly influence the phenomena to be studied at the temperature of interest. The furnace tube was purged with argon throughout the duration of the experiment. The argon flow rate was controlled by a mass flow meter.

The foaming behaviour of the slag/carbon system was investigated using a closely controlled and visually monitored sessile drop technique. A high quality, high resolution charge-coupled device (CCD) camera fitted with an IRIS lens was used to capture the live in-situ phenomena in the furnace. The output from the camera was channelled to a video cassette recorder (VCR) and a television (TV) monitor to record the entire process as a function of time. This allowed specific images, displaying the contact between the slag and carbonaceous material, to be captured as a function of time, from the videotape into a computer using a frame grabber. A time-date generator was used in the system to display the duration of the process. Specially designed computer software was used to determine the volume from the captured images, on the basis of a curve-fitting exercise. For a better understanding of reaction dynamics, images were recorded for up to 2 hours in most cases.

The slag composition was as follows: CaO 30.48%, MgO 11.72%, $SiO_2$ 13.34%, $Al_2O_3$ 5.24%, $Fe_2O_3$ 33.33%, MnO 5.24%.

Slag foaming investigations were first carried out on graphite and coke. Slag foaming investigations were later carried out on plastic.

Results & Discussion

Graphite/slag system: Preliminary results on slag foaming in a graphite/slag system are shown as a function of time in FIGS. 2A to 2F.

Figure 2:
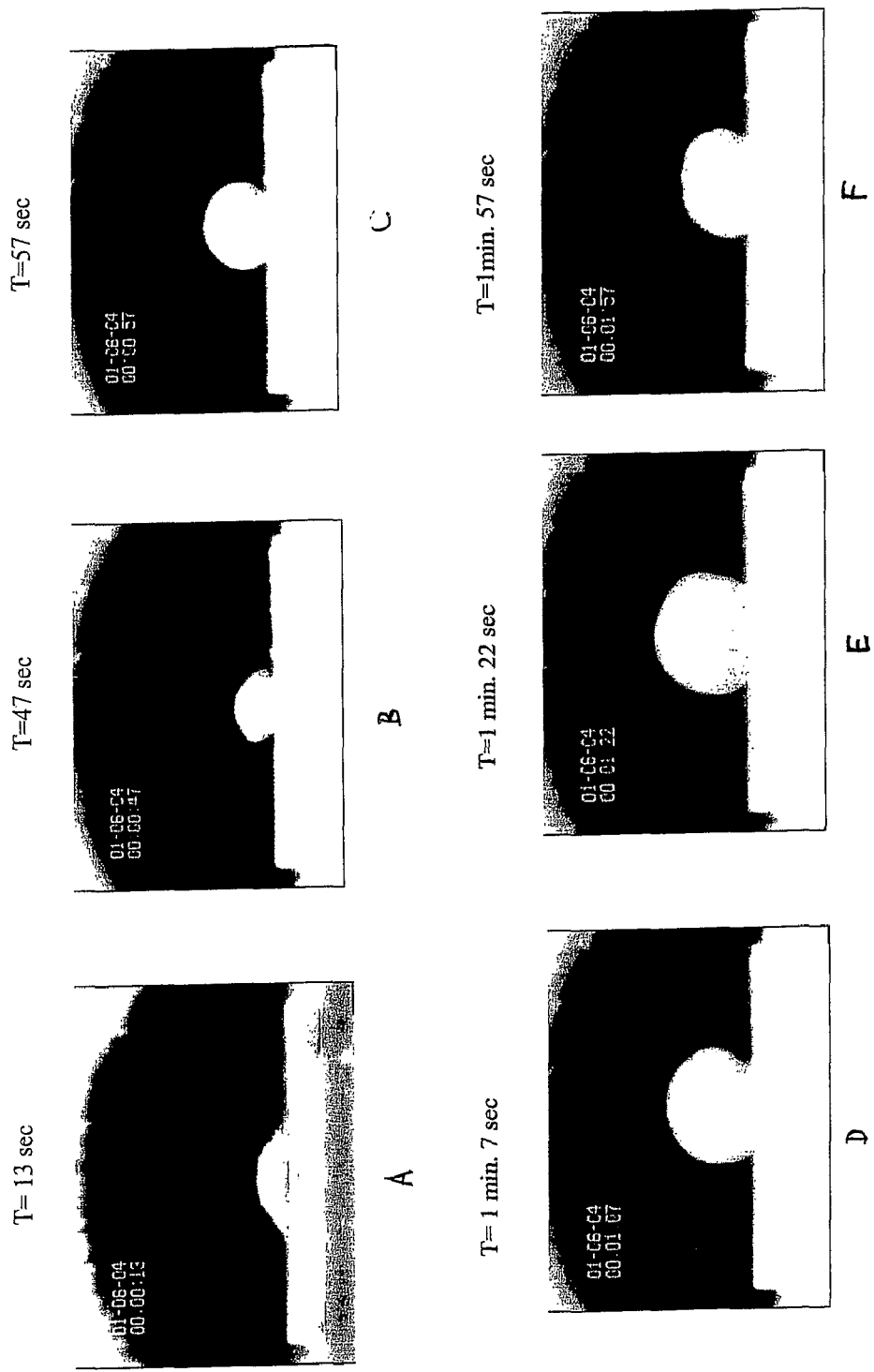
FIGS. 2A to 2F each depict a drop of slag and show in sequence slag foaming for a graphite/slag system as a function of time, using the horizontal tube resistance furnace set-up of FIG. 1.

Graphite showed good foaming characteristics with a steel production slag. In FIG. 2A at T=13 sec, the slag powder is shown as just beginning to melt. In FIG. 2B the drop of liquid is shown taking shape at T=47 sec and in FIG. 2C is shown completely formed at T=57 sec. The droplet then begins to grow in size, with increasingly larger drops being observed in FIG. 2D at T=1 min 7 sec, and in FIG. 2E and at T=1 min 22 sec, indicating that slag foaming is taking place. In FIG. 2F at T=1 min. 57 sec, the droplet has collapsed slightly indicating the partial escape of some gaseous products. Thus, the slag foaming in a graphite/slag system was found to be quite rapid and extensive.

Coke/slag system: Preliminary results on slag foaming in a coke/slag system are shown as a function of time in FIGS. 3A to 3F.

Figure 3:
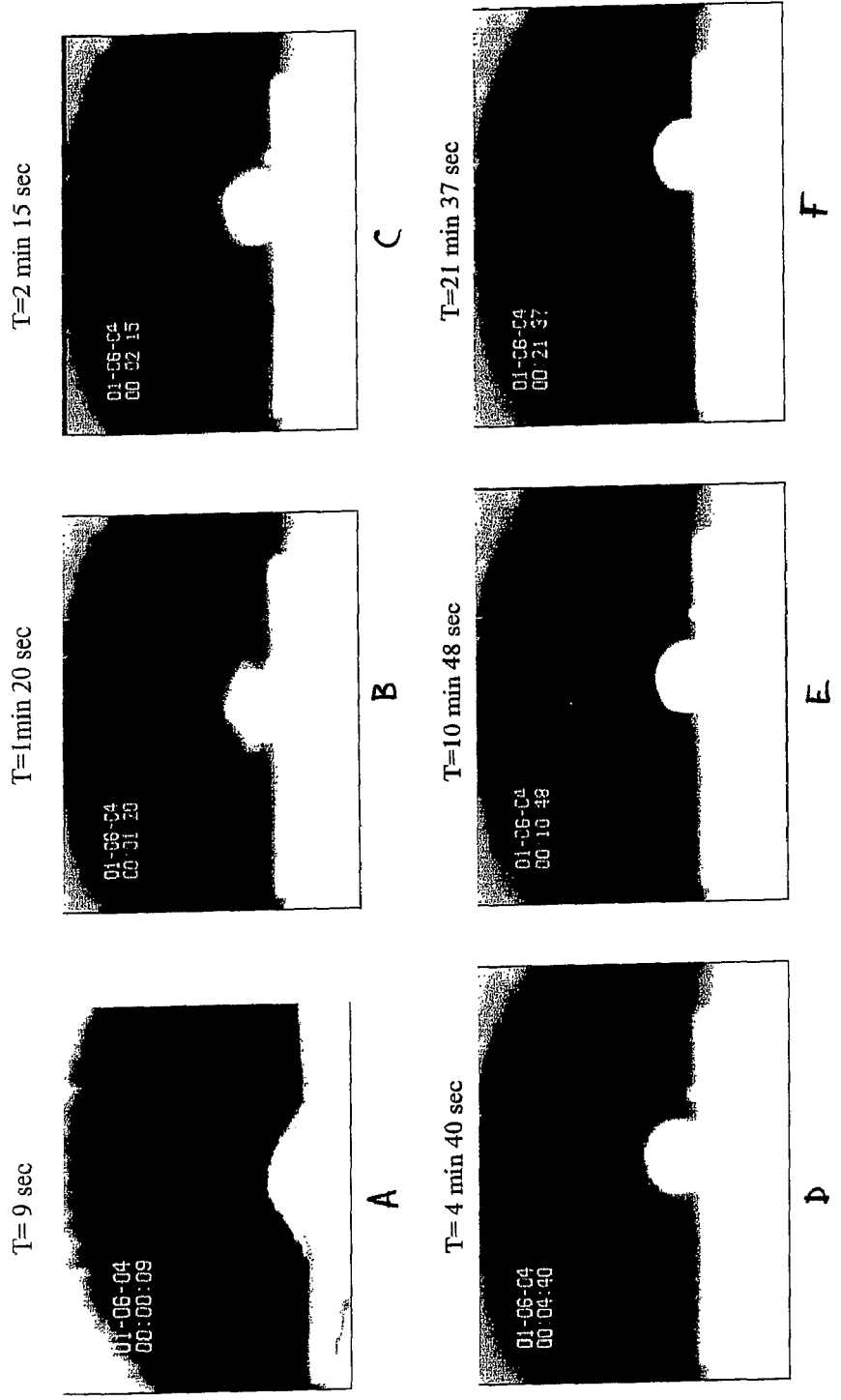
FIGS. 3A to 3F each depict a drop of slag and show in sequence slag foaming for a coke/slag system as a function of time, using the horizontal tube resistance furnace set-up of FIG. 1.

Coke showed less reliable foaming characteristics with a steel production slag. In FIG. 3A at T=9 sec, the slag powder is shown as just beginning to melt. In FIG. 3B the drop of liquid is taking shape at T=1 min 20 sec. In FIGS. 3C to 3F, images ranging from T=2 min 15 sec to T=21 min 37 sec are shown. Over this time period the liquid drop is completely formed. The four drops show minor fluctuations in size and volume, indicating a rather small level of slag foaming in the coke/slag system. The rate of slag foaming in the coke/slag system was thus slower than the graphite/slag system.

Carbon dissolution studies revealed that the dissolution rate constant for coke was smaller than that for graphite. The slag foaming behaviour of these two carbon types was quite different, with the rate and extent of slag foaming in the graphite/slag system being much higher than the coke/slag system. Thus, a relationship between carbon dissolution rate and slag foaming was postulated.

Example 2

An analysis of plant operating data from an operating EAF showed that increasing levels of coke injection resulted in increased consumption of oxygen, although they did not yield any well-defined pattern in power consumption per ton of steel charged.

The operating EAF used two different forms of carbon in its operation. Along with coke containing~90% C, it used a few tons of flat iron containing 4% C. Carbon present in the flat iron was already dissolved when the flat iron melted, whereas carbon present in the coke was present in a solid state.

The form of carbon (solute or solid carbon) was observed to have a significant effect on average power consumed/ton of steel. With an increased amount of flat iron charged (equivalent to higher levels of solute carbon) there was a significant reduction in power consumption. This trend was interpreted in terms of the role played by the carbonaceous material and indicated that an increase in slag foaming lead to a decrease in power consumption, per ton of steel charged. The efficiency of flat iron carbon in EAF steel production was thus found to be much higher than the corresponding efficiency for coke.

The inventors noted that:
1. The kinetics of carbon dissolution into liquid iron depended strongly on the nature of carbonaceous material. For example, the dissolution rate constant for coke was smaller than that for graphite.
2. The results of the graphite/slag and coke/slag systems of Example 1 showed that the rate and extent of slag foaming with graphite was much higher than coke.
3. The kinetics of carbon/slag interactions are expected to be quite different for solute carbon and for coke, which resulted in wide variations in their slag foaming behaviour.

These results indicated that an appropriate choice of carbonaceous material could play an important role in slag foaming and therefore in the energy efficiency of EAF operation. The results also lead the inventors to surmise that a carbon-containing polymer could be added to an EAF and partially combust as a fuel and to produce carbonaceous material residues, which could give rise to slag foaming and/or metal oxide reduction and/or recarburisation.

Example 3

The inventors now tested the addition of waste plastics to an EAF process in place of at least some of the traditional source of carbon (eg. coke). The following raw materials were assembled to simulate the raw materials fed to an EAF.

Raw Materials

The following carbonaceous materials, plastics and slag were employed to conduct comparative slag foaming experiments.

Figure 6:
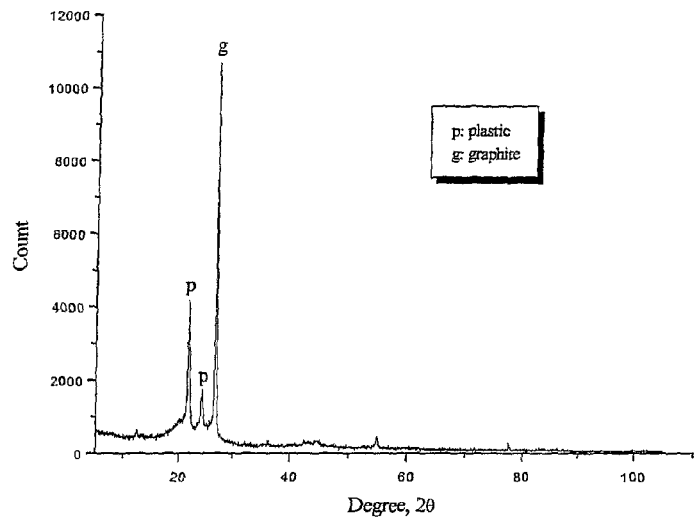
FIG. 6 shows an XRD spectra of a carbonaceous residue from a 50% plastic and 50% graphite mixture after being reacted in a drop tube furnace, as described in Example 5.

Carbonaceous materials: graphite; coke; residue generated from a mixture (1:1) of graphite and plastic (the XRD spectrum of this residue is provided in FIG. 6). The ratio of 1:1 may vary from furnace to furnace.

Plastic material: Linear Low Density Polyethylene (LLDPE) was obtained to represent the major constituent of plastic waste. Particle sizes of polyethylene samples used were less than 100 micrometers.

Slag: The following slag composition (% wt) was prepared: 30.48% CaO; 11.72% MgO; 13.34% $SiO_2$; 5.24% $Al_2O_3$; 33.33%, $Fe_2O_3$; 5.24% MnO.

A substrate of carbonate material powders were prepared by hydraulic pressing under a pressure of $2.2 \times 10^8$ Pa. The graphite and coke powders were used as supplied. The preparation process of the graphite and plastics mixture is described in Example 4.

The slag was prepared by heating the homogeneous mixture of oxide ingredients in the mixing ratio shown above to 1650° C., and then casting the melt in a copper mold after around 30 min from complete melting.

Apparatus

The horizontal furnace of FIG. 1 was used for carrying out sessile drop experiments. The dimension of the ceramic furnace tube was Φ50 mm inner diameter and 1000 mm in length. A specimen holder made of alumina or graphite was inserted into the tube through a furnace cover. The apparatus permitted the sample to be held in the cold zone of the furnace before the furnace was heated up to the desired temperature, typically 1550° C. in this Example.

Experimental Procedure

To investigate slag foaming, slag/carbon interactions were first investigated in the horizontal tube resistance furnace. The slag/carbon assembly was held in the cold zone of the furnace until the desired temperature (1550° C.) was attained and equilibrated in the hot zone of the furnace. The assembly was then inserted into the hot zone at the desired temperature. This procedure eliminated any reaction that could occur at lower temperatures and possibly influence the phenomena to be studied at the temperature of interest. The furnace tube was purged with argon throughout the duration of the experiment.

The foaming behaviour of the slag/carbon system was again investigated using a closely controlled and visually monitored sessile drop technique. Again the CCD camera fitted with an IRIS lens was used to capture the live in-situ phenomena in the furnace. Again the output from the camera was channelled to a VCR and TV monitor to record the entire process as a function of time. The images displaying the contact between the slag and carbonaceous material were captured over time, from the videotape and into a computer, using a frame grabber. Again the time-date generator was used to display the duration of the process. Computer software determined the volume from the captured images, on the basis of a curve-fitting exercise.

Slag powder (approximately 0.20 g) was placed on the carbonaceous materials substrate, which was held on the specimen holder. Once the desired furnace temperature was reached the specimen holder was pushed from the cold zone to the hot zone of the furnace to start the experiment. The whole reaction process was monitored by the CCD camera and recorded using video-tape. The images were analyzed further to calculate sample volume. Throughout the experiment, inert gas argon was flown at a flow rate of 1 l/min. The off-gas was passed through an IR analyzer in order to obtain CO and $CO_2$ content, which can be used to evaluate the reaction rate.

Experimental Results

The experiments were conducted to investigate the slag foaming behaviour caused by the reaction between iron oxide in slag and the carbonaceous materials: graphite, graphite/plastic residue mixture, and coke. Typical images are shown in FIGS. 4A to 4C.

The reaction between graphite and slag was observed to produce the most vigorous slag foaming. The volume of the drop of foamed slag was the largest as clearly shown in the FIG. 4A.

During the reaction of the 50% graphite/50% plastics mixture, bubbles evolved from the slag droplet. The occurrence of slag foaming phenomenon in the case of the graphite/plastics mixture was established on the basis of a high temperature visualisation image as shown in FIG. 4B and also on the basis of generation of CO in the off-gas, indicating a reduction of iron oxide. This indicated that plastics could be added to an EAF, combust as a fuel, and the carbonaceous residues could produce slag foaming and/or metal oxide reduction and/or recarburisation effects.

Example 4

Preparation Process of Graphite/Plastics Mixture

Figure 5:
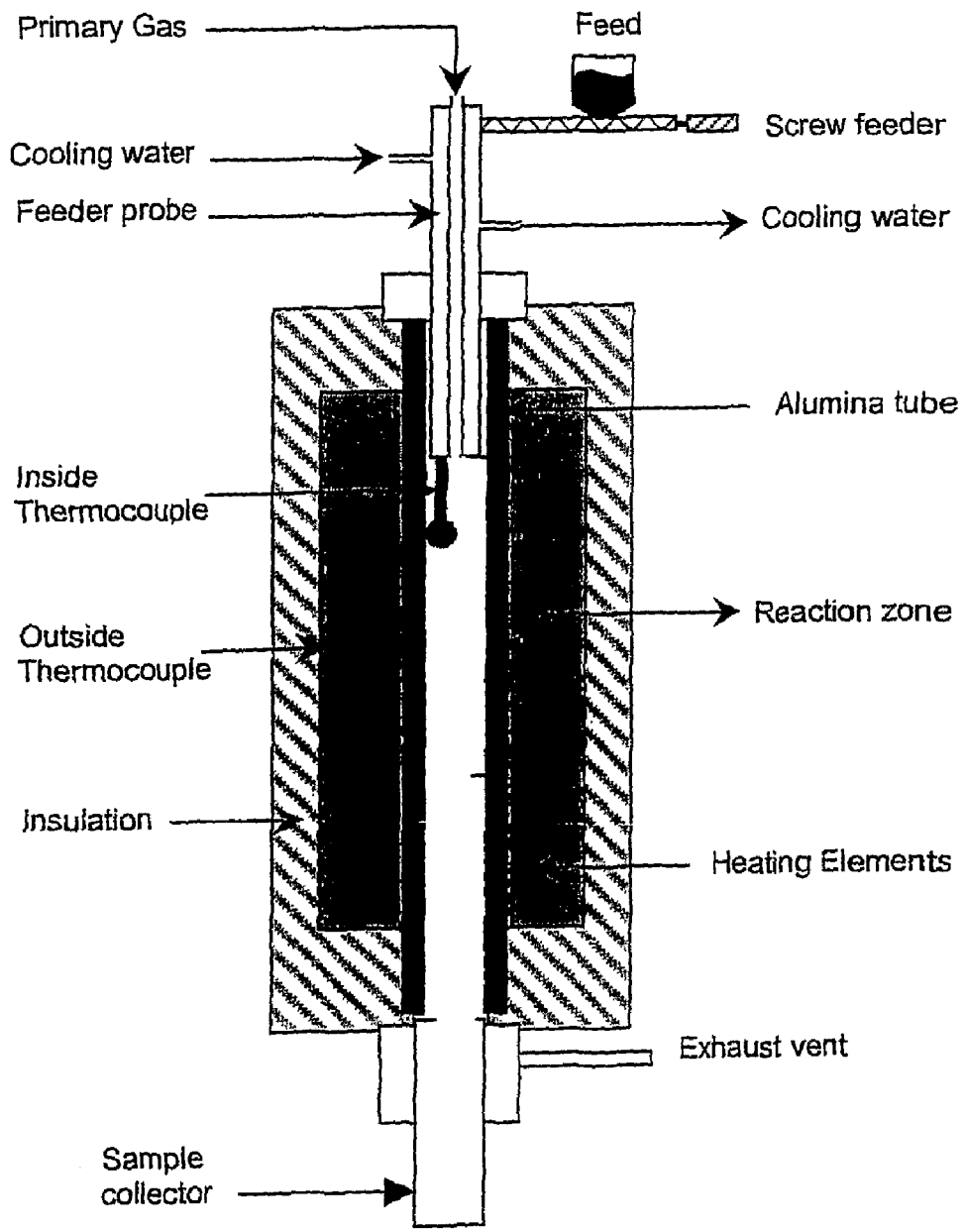
FIG. 5 shows a schematic diagram of a drop tube furnace set up, as described in Example 4.

A high temperature gas-phase reaction of a plastic-graphite blend was performed using a drop tube furnace (DTF). The drop tube furnace is shown schematically in FIG. 5.

Each trial conducted in the DTF was completed at 1200° C. and, once the furnace had reached this operating temperature, oxygen and nitrogen gases were introduced into the furnace at desired flow rates. Gas flow rates and compositions were controlled during these experiments using an automated flow controller. Cooling water was circulated through the furnace injector during each test so as to prevent overheating and the occurrence of reactions prior to the interaction of oxygen and the injected fuel materials in the furnace reaction zone. The collector also served the purpose of retaining unburnt chars generated during each experiment.

A plastic-graphite blend was introduced into the experimental reactor using a dry material feeder through a water-cooled feeding probe. A mixture of oxygen and nitrogen gas was used to carry the plastic and graphite solid reactants into the reaction zone. The experimental details were as follows:

| | |
|---|---|
| Temperature (° C.) | 1200 |
| Total gas flow rate (L/min) | 1.0 |
| Feeding rate (g/hr) | 10.0 |
| Particle residence time (seconds) | ~1-2 |
| Gas purity (%) | $N_2$ = 99.5 $O_2$ = 99.0 |
| Gas composition | 24% $O_2$, rest $N_2$ |
| Graphite particle size | <100 μm |
| Plastic particle size | <100 μm |

This experiment indicated that, under operating conditions that may simulate those in an EAF, the plastic could be charged into an EAF, combust as a fuel, and form carbonaceous residues useful for causing slag foaming, metal oxide reduction and in recarburisation of molten iron.

Example 5

EAF Slag Foaming Phenomenon Accompanying the Reaction Between Slag and Carbonaceous Materials Experiments were carried out to study an actual EAF slag sample, more particularly, the slag foaming phenomena during the reaction between the slag and carbonaceous substrates under an inert argon atmosphere. The slag composition was 27.0% CaO; 40.3% FeO; 7.9% $Al_2O_3$; 8.8% MgO; 10.9% $SiO_2$; and 4.8% MnO. The basicity of the slag was 2.5 (% CaO/% $SiO_2$). Three carbonaceous materials were chosen for the experiments. They were pure graphite; a carbonaceous residue from a mixture of graphite and plastic with a mixing ratio of 1:1; and industrial coke. The ratio of 1:1 may vary for different EAF's. Around 0.075 g slag was used for each run. The temperature was set at 1550° C.

FIG. 6 shows the XRD spectrum of the residue generated from 50% plastic and 50% graphite mixture after being reacted in a drop tube furnace (DTF). The peaks of plastic and graphite can be clearly seen.

Figure 7:
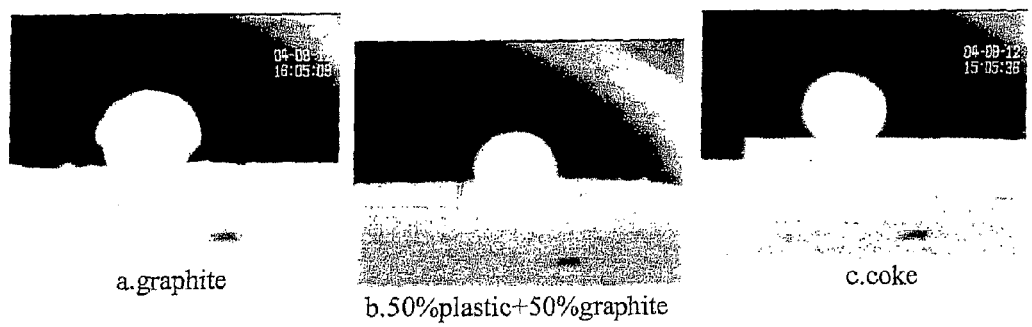
FIG. 7 shows CCD images of slag foaming caused by various carbonaceous materials, as described in Example 5.

The slag/carbon foaming phenomenon was recorded using a CCD camera. FIG. 7 shows the typical images of foamed slag drops reacting with various carbonaceous substrates at the time of approximately 200 secs. Slag foaming was most vigorous in the case of reaction with graphite substrate. Although the reaction between slag and coke and a mixture of plastic and graphite was not as vigorous, the results indicated that plastic could act as both slag foaming agent and reductant with EAF slag.

Figure 8:
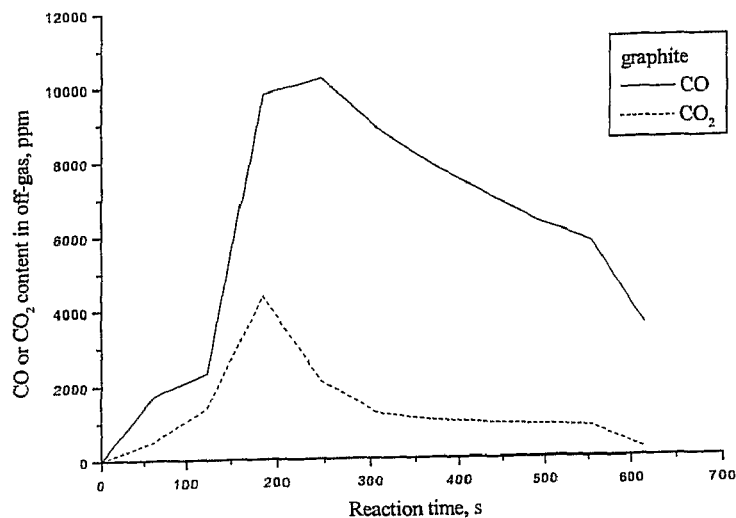
FIG. 8 shows the IR results for a reaction between a graphite substrate and an industrial slag, as described in Example 5.
Figure 9:
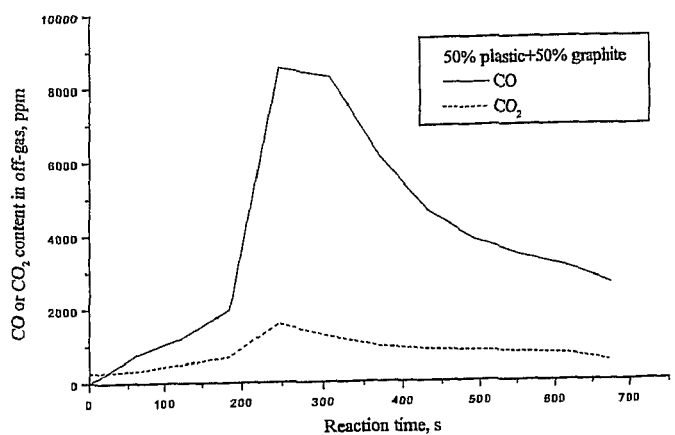
FIG. 9 shows the IR results for a reaction between a 50% plastic and 50% graphite substrate and industrial slag, as described in Example 5.
Figure 10:
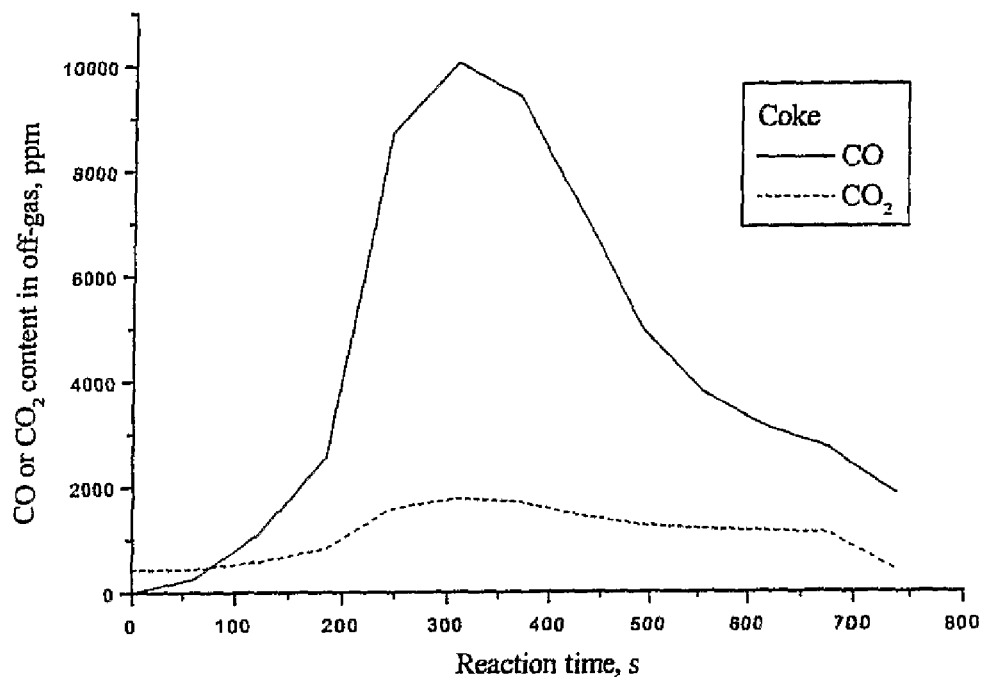
FIG. 10 shows the IR results for a reaction between a coke substrate and an industrial slag, as described in Example 5.

The CO and $CO_2$ contents in DTF off-gas were analyzed using an IR analyzer. The results are shown in the following FIGS. 8, 9 and 10. In the case of a graphite substrate, the off CO and $CO_2$ gas contents were only slightly larger than the other cases. This implied that gas evolution due to a reduction of iron oxide was occurring with all three carbonaceous materials and all three were contributing to slag foaming.

In addition, the results of Example 5 are in agreement with the results of the previous Examples, notwithstanding the difference in composition between the industrial slag and laboratory prepared slags.

Example 6

The combustion efficiency of waste plastics was investigated to test the suitability of waste plastics as a fuel in an EAF or other non-blast-type furnace. The combustion efficiency was evaluated using the drop tube furnace (DTF) of FIG. 5 using the same conditions as in Example 4. The % C in the samples was determined before and after each test run (ie. after each sample was passed through the DTF). A LECO carbon content analyser was used for determination of carbon content.

Each sample comprised varying levels of powdered waste plastic mixed with powdered coke, starting from 0 wt % plastic and moving up to 50 wt % plastic. The results are presented in the following table:

| Plastic wt % with coke | C wt % before | C wt % after | Combustion Efficiency (%) |
|---|---|---|---|
| 0 | 80.43 | 80.39 | 0.25 |
| 20 | 82.376 | 80.921 | 9.26 |
| 30 | 82.79 | 81.736 | 6.97 |
| 40 | 83.723 | 82.27 | 9.79 |
| 50 | 84.372 | 83.145 | 8.63 |

The table lists the resulting combustion efficiency (last column), and also lists a raw wt % C analysis. The decrease in wt % C is as a result of the carbon reacting (combusting) to produce carbon monoxide and dioxide gas.

The results show that the combustion efficiency of coke is very poor, but when waste plastics are mixed with the coke the combustion efficiency is increased. In addition, the residue that is left after combustion then participates in other reactions in the EAF or other non-blast-type furnace.

Example 7

Figure 11:
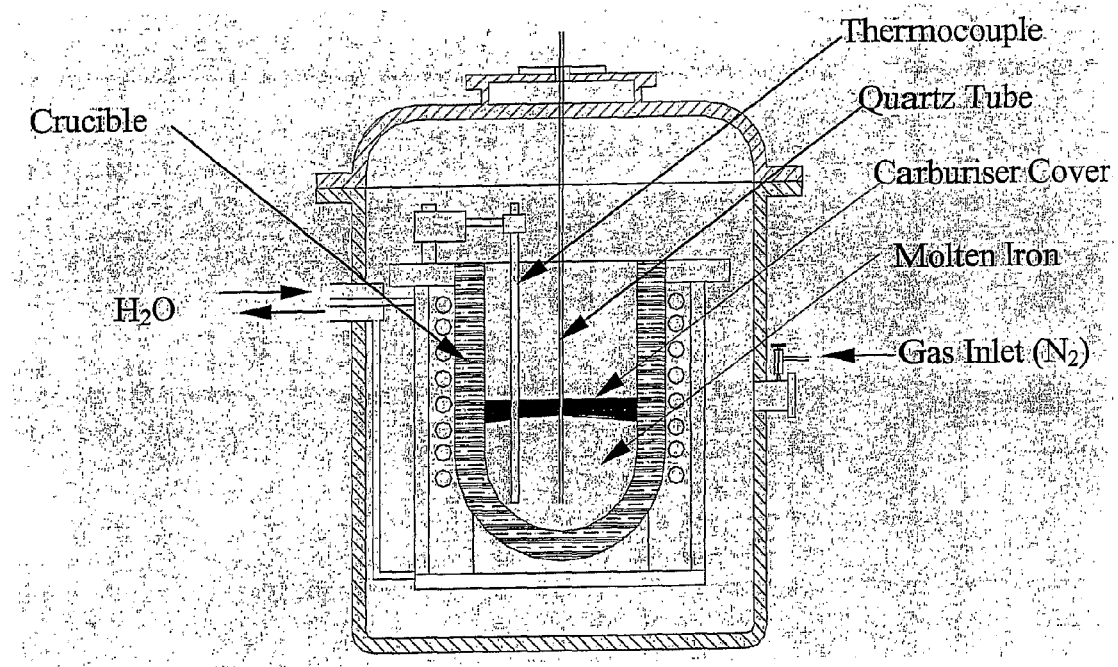
FIG. 11 shows a schematic diagram of an induction (carbon dissolution) furnace, as described in Example 7.

To investigate the function of waste plastics as a recarburiser in ferro-alloy production, carbon dissolution of a carbonaceous reside was investigated in a laboratory scale induction furnace as schematically depicted in FIG. 11.

The temperature of the furnace was controlled to achieve a molten iron bath temperature of 1550° C. (to simulate an EAF operating temperature). In this regard, cooling water was circulated through a "jacket" heat exchanger configuration surrounding the furnace during the procedure so as to prevent overheating and to maintain a generally constant bath temperature. A nitrogen atmosphere was created above the molten bath via the $N_2$ gas inlet.

A powder of waste plastic was fed directly into the furnace, the powder feeding onto the molten iron bath. This plastic combusted to produce a carbonaceous residue, which residue could function as a recarburiser. As an alternative, waste plastic from eg. the drop tube furnace of FIG. 5 could be introduced onto the molten iron bath.

The carburiser cover method was the standard approach used to study carbon dissolution. In this regard, the carbonaceous material actually sat on top of the metal bath and formed a carburiser cover. This is because, in the experimental procedure, waste plastics material is fed onto the top of the metal bath. A thermocouple to measure bath temperature together with a quartz sampling tube for removal of metal samples to progressively measure carbon dissolution over time, extended through the carburiser cover. The LECO carbon content analyser was then used to analyse the carbon content of metal samples extracted.

Figure 12:
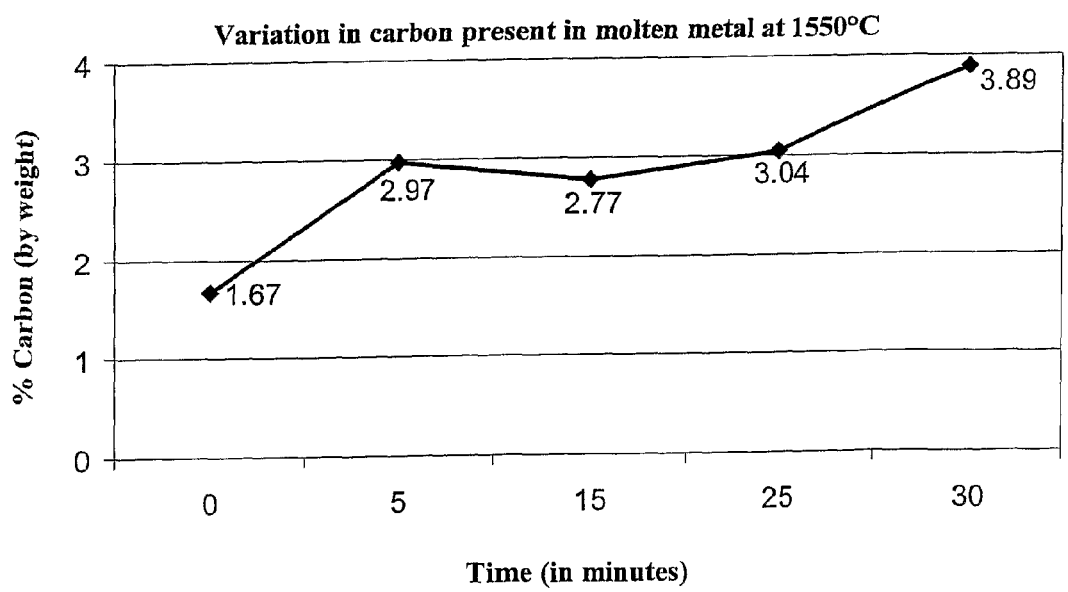
FIG. 12 plots the % of carbon dissolution in a molten ferro-alloy against time for the induction furnace of FIG. 11, and as described in Example 7.

The results of carbon dissolution are presented in FIG. 12. In FIG. 12 it can be seen that initially (Time=0) the bath had a dissolved carbon content by weight of 1.67%. Plastic residue was then added and the dissolved carbon content increased to 2.97%, and then levelled out at around the 3% level. At Time=25 minutes, further plastic residue was added to the bath and the dissolved carbon content increased to 3.89% at T=30 minutes.

This experiment demonstrated that the plastic residue could be used as an effective recarburiser, and that progressive increased levels of dissolved carbon could be achieved with progressive introduction of plastic residue. In an EAF or other non-blast-type furnace, the residue for recarburisation would typically be generated by introducing the waste plastic itself into the furnace, allowing it to combust to produce a carbonaceous residue, and then facilitating its mixing into the molten metal bath and allowing it time to increase carbon content to a desired level. The waste plastic can replace more expensive recarburisers such as anthracite coal and graphite.

Example 9

Combustion Efficiency of Coke/Plastics Mixtures

Figure 14:
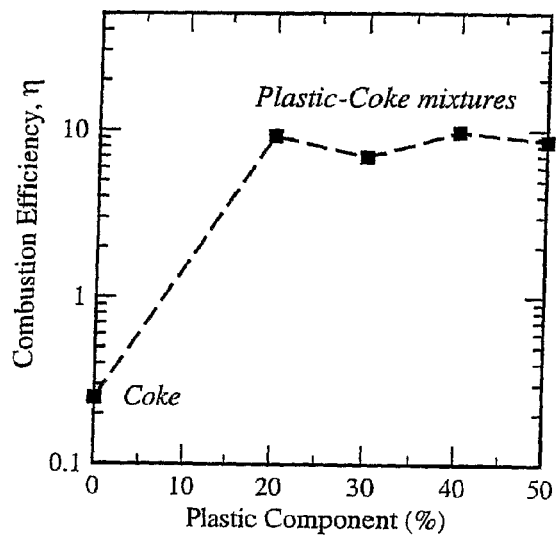
FIG. 14 plots the combustion efficiency, η, of coke and mixtures of coke with plastics at 1200° C., as described in Example 9.

Coke and its mixtures with plastics (up to 50 wt %) were burnt in the DTF at 1200° C. in an oxidising atmosphere containing 20% $O_2$. The feeding rate was around 0.0278 g/s. Carbonaceous residues were collected and their carbon content was measured. Assuming a negligible loss of ash during combustion in DTF, the combustion efficiency, η, was calculated as:

$$\eta = \left(1 - \frac{A_0}{A_i}\frac{C_i}{C_0}\right) \times 100\%$$

where $A_0$ and $A_i$ were ash content before and after combustion, $C_0$ and $C_i$ respectively represented carbon content before and after combustion in DTF, respectively. Experimental results on the combustion efficiency of coke/plastics mixtures are shown in FIG. 14. A logarithmic scale was used along the y-axis due to the large variations in combustion efficiency.

In this example overall combustion efficiency of the coke/plastics mixtures was observed to be nearly forty times the combustion efficiency of coke alone, i.e. ~10 for coke-plastics mixtures as against 0.25 for coke. Higher combustion efficiency of coke/plastics mixtures could be, to a certain extent, attributed to a large release of volatiles during combustion of plastics. Whilst the mixtures of coke and plastics generally had much higher combustion efficiency than coke, no well-defined trend was observed on the effect of mixing ratio. However, no degradation in the combustion efficiency was observed with increasing plastic component.

Example 10

Slag Foaming on Carbonaceous Residues

Figure 15:
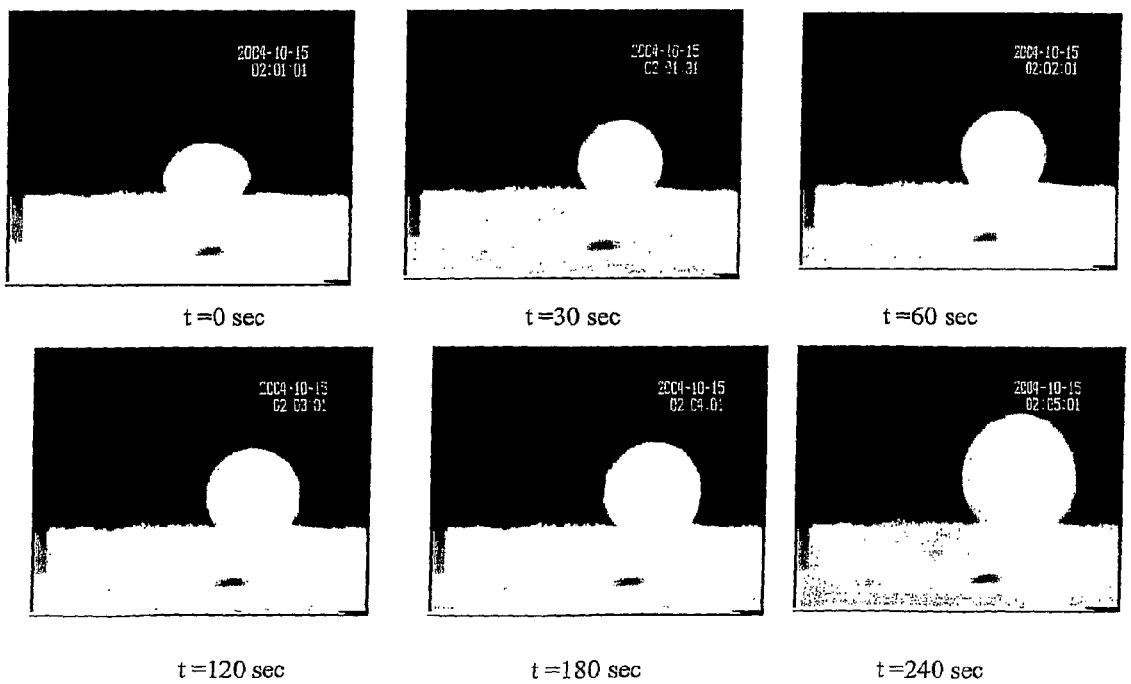
FIG. 15 shows CCD images of slag foaming as a function of time for 70% coke–30% plastic residue/slag system at 1550° C., as described in Example 10.

Carbonaceous residues from mixtures of coke and plastic after burn-off in the DTF were pressed into a die under 9 tonnes/cm² load and were used as a substrate for slag foaming experiments. After reaching desired temperatures, the slag began to melt and the iron oxide present in the slag started reacting with the carbonaceous substrate to give off CO and $CO_2$ gases and metal iron. The evolution of CO and $CO_2$ gases through the slag phase lead to slag foaming. The reaction process was monitored using CCD camera and recorded to DVD disc for further image analysis. FIG. 15 shows the typical images of a reaction between a slag and a mixture of 30% plastic+70% coke. After the slag melt down, gas bubbles were observed to evolve through the slag phase immediately. The slag droplet rolled around on the substrate vigorously due to the generation and rupture of the gas bubbles. After about 600 secs, the slag droplet calmed down gradually with a considerable reduction in gas generation.

Also, during the reaction between the slag and coke/plastic substrate, FeO in the slag and C in the substrate reacted to generate CO and $CO_2$ gas. The concentrations of these gases are measured in the off-gas mixture using an IR spectrometer.

Figure 16:
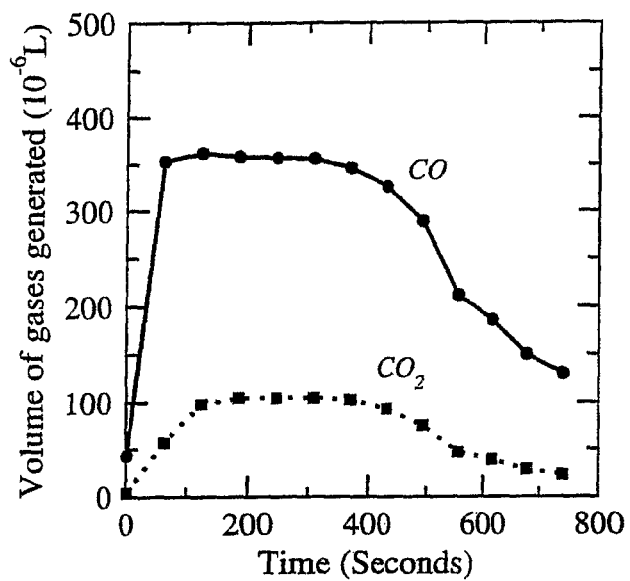
FIG. 16 plots CO and $CO_2$ gas generation as a function of time, as described in Example 10.
Figure 17:
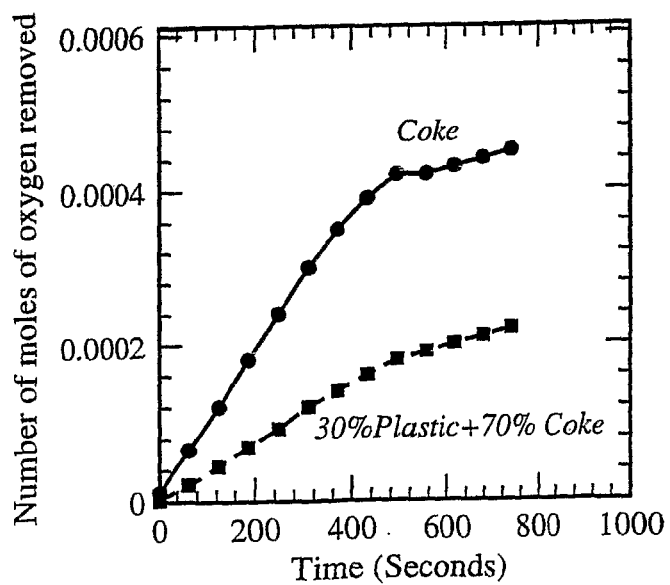
FIG. 17 plots the number of moles of oxygen removed during interactions of slag with coke and with 30% Plastic+70% coke mixture, as described in Example 10.

The resulting typical CO and CO2 gas contents are shown in FIG. 16. It can be seen that both the CO and $CO_2$ gas contents increased sharply to maximum values, stabilised for nearly 300 seconds and then decreased with reaction time. Much less $CO_2$ gas was detected in the off-gas than CO. The volume of CO and $CO_2$ evolved obtained from the off-gas analysis were then converted into the number of moles using the standard gas equation. The number of moles of oxygen removed reflected the kinetics of reduction reactions between slag and carbonaceous material, as shown in FIG. 17.

The results indicated that the reduction reactions of slag with coke were much faster than the corresponding reactions with plastic-coke mixture, resulting in a larger volume of emitted gases. These gases give rise to slag foaming and caused changes in the volume of the slag droplet.

Figure 18:
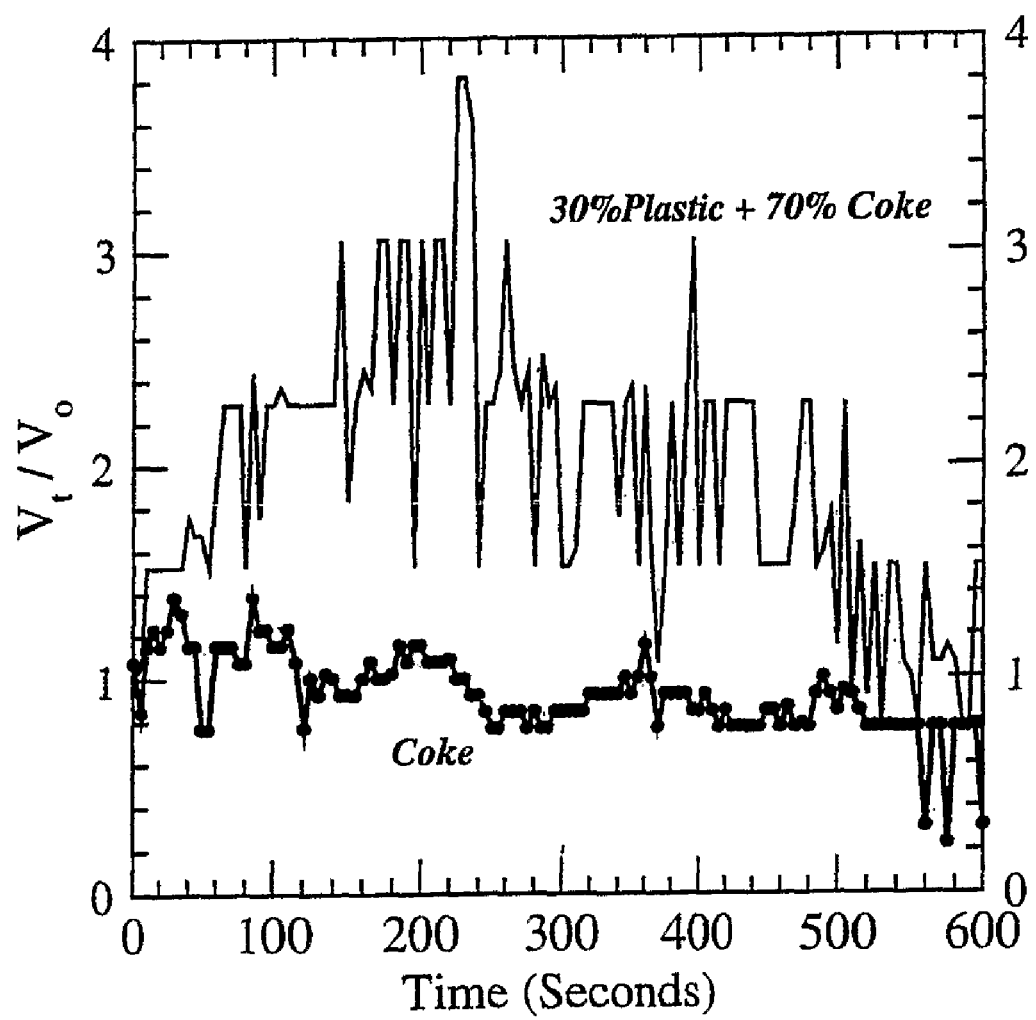
FIG. 18 shows the $V_t/V_o$ plots for coke and 30% plastic+70% coke mixtures at 1550° C., as described in Example 10.

Gas hold-up in the slag droplet was then measured in terms of $V_t/V_o$, where $V_t$ is the volume of slag droplet at time t and $V_o$ is the initial volume. FIG. 18 plots $V_t/V_o$ as a function of time for coke and 30% plastic+70% coke mixture. The results showed that much higher levels of slag foaming were observed for 30% plastic+70% coke mixtures as compared to coke. The droplet grew much larger in size in the case of coke/plastic mixture and this size increase was sustained for a much longer period for the plastic mixture as compared to coke. To a great extent, this could be due rather slow rate of reactions between the plastic mixture and slag (FIG. 17), resulting in a slow rate of gas emission, thus resulting in smaller bubbles and a sustained foam over longer periods. For coke, the bubble growth was rapid with high gas levels escaping from the slag droplet.

The Example 9 and 10 investigations on coke and a range of coke/plastic mixtures further demonstrated the feasibility of utilising waste plastics in EAF steelmaking. Coke/plastics mixtures showed much better combustion than pure coke. The slag foaming characteristics of coke/plastics mixtures were found to be better than pure coke. The slag droplet showed a much larger increase in volume, and the volume change was sustained over a longer period of time. The results also indicated that partial replacement of coke with coke/plastic mixtures could enhance carbon combustion.

Example 11

Figure 4:
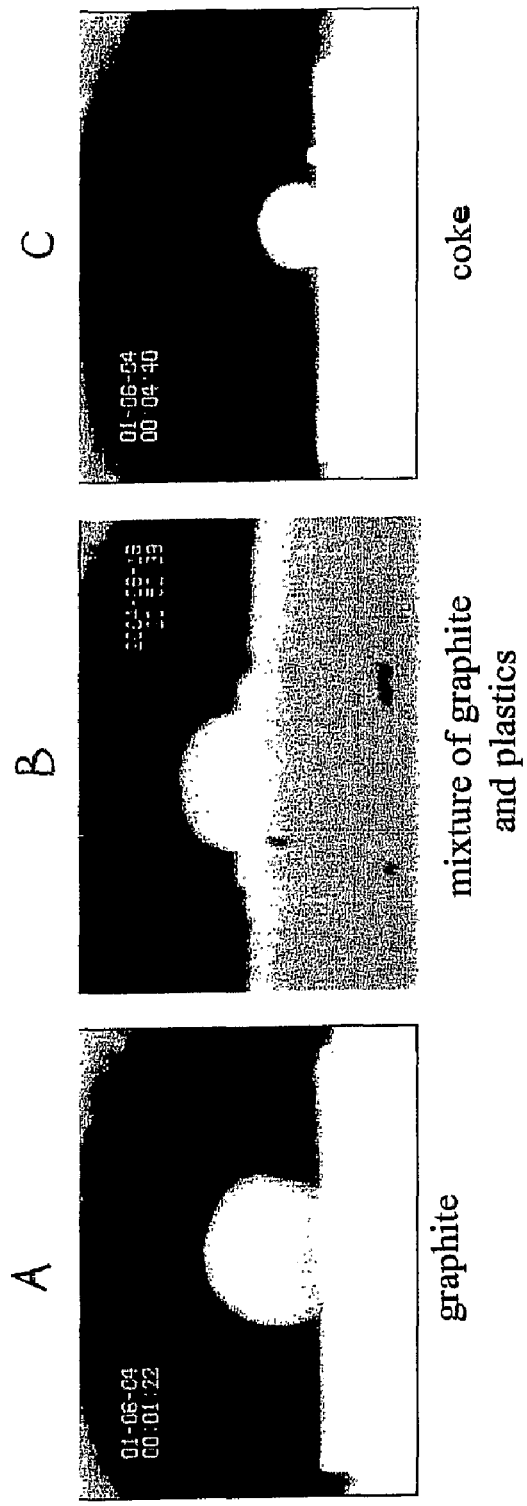
FIGS. 4A to 4C respectively depict a drop of slag for graphite, graphite/plastic and coke, each with a slag system, and using the horizontal tube resistance furnace set-up of FIG. 1.

In an experimental procedure similar to that described in Example 3 and as depicted in FIG. 4, the foaming characteristics of a coke/slag system and a 50% coke/50% plastic/slag system were investigated. In this case, the plastic was a High Density Polyethylene (HDPE), with a particle size of less than 100 micrometers. The slag was similar to that of Example 5 and 0.078 grams and 0.092 grams of slag were respectively employed for the two systems. The runs were conducted at different times, hence the weights of slag are not exactly the same. However, this weight difference does not affect the experimental outcome.

Figure 13A:
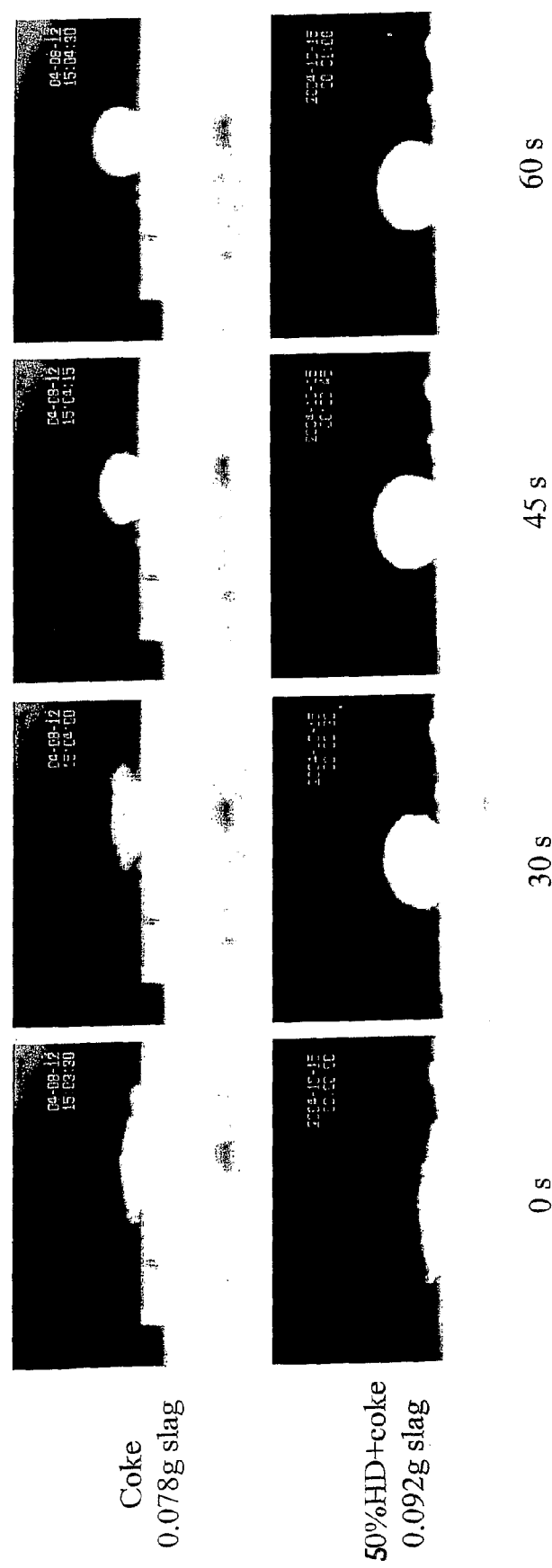
FIGS. 13 A&B depict a drop of coke/slag (upper row) and coke/HDPE plastic/slag (lower row) over time, using the horizontal tube resistance furnace set-up of FIG. 1.
Figure 13B:
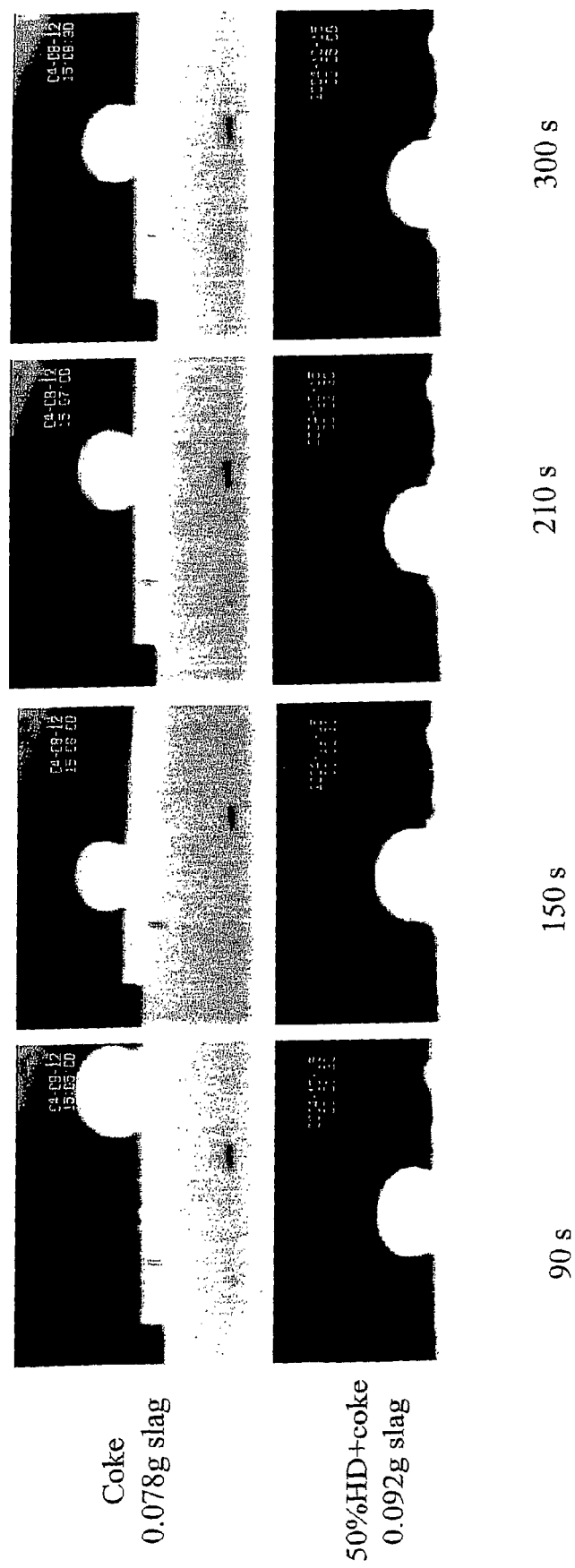

FIGS. 13A&B depict in side by side comparison the drop foaming behaviours of the two systems at the time intervals 0, 30, 45, 60, 90, 150, 210 and 300 seconds. It can be seen that the coke/plastic/slag system had a relatively more rapid foaming characteristic than the coke/slag system.

In other words, plastics such as HDPE can also offer an enhanced slag foaming characteristic to an EAF or other non-blast-type furnace, indicating that many other plastics may offer a similar enhanced performance.

Example 12

The inventor conceived of and proposed an index to indicate the suitability of a plastic for its re-use in ferro-alloy production and as a combustible fuel in other non-blast-type furnaces. The index was referred to as the Green Index for Plastics (or "GIP" index). The inventor conceived that the index could also be used in a general sense as relating to recyclability of plastic, and yet still be known as the GIP index.

In this way, a mechanism could be established by which the general public could recognise the ability of a plastic to be recycled, for example in ferro-alloy production such as steelmaking. The inventor noted that the current system used for identification of plastics type, does not provide any information regarding the plastic's recyclability. The current system merely provides information regarding the type of plastic (eg numeral 1 for PET etc).

Finally the inventor surmised that the GIP index could then be built upon by developing a related GIPS index, where the "S" stands for and indicates the suitability of the plastic for use in steelmaking.

In general, the experiments also indicated, that for the production of ferro-alloys other than steel, and using an EAF, un-agglomerated plastic could be charged into the furnace, could combust as a fuel, and could form carbonaceous residues useful for slag foaming, and to cause metal oxide reduction, and recarburisation of molten metal (eg. iron).

In addition, the experiments also indicated that for reheating furnaces and the like, the un-agglomerated plastic could be charged into the furnace, for example as a supplement to other fuels such as natural gas, and yet still combust as a fuel. This is especially so at the higher temperatures (greater than 1000° C.) used in furnaces such as reheating furnaces in steel forming operations.

Thus, an effective means for using and consuming the vast quantities of waste plastics in society is provided.

Whilst a number of specific embodiments have been described, it should be appreciated that the method for producing a ferro-alloy can be embodied in many other forms.

What is claimed is:

1. A method of foaming slag formed in an electric arc furnace during the production of a ferro-alloy, the method comprising:
    charging the furnace by injecting an un-agglomerated carbon-containing polymer into the slag of the ferro-alloy such that the polymer functions as a slag foaming precursor by generating CO gas through the reduction of iron oxide in the slag by carbon, and the oxidation of carbon, from the carbon-containing polymer, the slag having an initial volume that is increased and the increased volume is sustained.

2. The method as claimed in claim 1, further comprising injecting the un-agglomerated carbon-containing polymer into the furnace such that the un-agglomerated carbon-containing polymer at least partially combusts and produces a carbonaceous combustion residue, the residue oxidizing to cause slag foaming.

3. The method as claimed in claim 2, wherein the residue may also acts as a reducing agent or functions as a recarburiser.

4. The method as claimed in claim 1 further comprising injecting an additional source of carbon into the furnace.

5. The method as claimed in claim 4 wherein the additional source of carbon is coal, coke, carbon char, charcoal and/or graphite.

6. The method as claimed in claim 4 wherein the un-agglomerated carbon-containing polymer and the additional source of carbon are injected into the furnace in a weight ratio of 1:1.

7. The method as claimed in claim 1 wherein the un-agglomerated carbon-containing polymer is a waste plastic.

8. The method as claimed in claim 1 wherein the carbon-containing polymer consists of the atoms C, H and optionally O.

9. The method as claimed in claim 1 wherein the un-agglomerated carbon-containing polymer is injected into the furnace in the form of polymer particles.

10. The method as claimed in claim 1 wherein the ferro-alloy produced is steel.

11. A method for producing a ferro-alloy in an electric arc furnace, the method comprising:
    charging the furnace with feedstock for the ferro-alloy;
    heating the feedstock in the furnace to a molten state and to form a slag on a molten surface of the alloy/feedstock; and
    charging the furnace with an un-agglomerated carbon-containing polymer that functions as a slag foaming precursor by generating CO gas through the reduction of iron oxide in the slag by carbon, and the oxidation of carbon, from the carbon-containing polymer, by injecting the un-agglomerated carbon-containing polymer into the slag, the slag having an initial volume that is increased and the increased volume is sustained.

12. The method as claimed in claim 11 wherein the un-agglomerated carbon-containing polymer is injected so as to combust in the furnace and release heat energy to the molten alloy/feedstock and to generate an agent that foams the slag.

13. A method as claimed in claim 12 wherein the agent, in addition to foaming the slag, causes a chemical reduction of each metal oxide in the slag to produce the ferro-alloy; and/or recarburises a resultant alloy of iron and carbon.

14. The method as claimed in claim 11 wherein the un-agglomerated carbon-containing polymer is injected with an additional agent that causes a chemical reduction of each metal oxide in the molten slag.

15. The method as claimed in claim 14 wherein the additional agent is an additional source of carbon for injecting into the furnace.

16. The method as claimed in claim 11 wherein the injecting of the un-agglomerated carbon-containing polymer into the furnace is such that the un-agglomerated carbon-containing polymer at least partially combusts and produces a carbonaceous combustion residue, the residue oxidizing to cause slag foaming.

* * * * *